US012175842B2

(12) United States Patent
Deaton et al.

(10) Patent No.: US 12,175,842 B2
(45) Date of Patent: Dec. 24, 2024

(54) AUTOMATED SIDE OPENING OVEN DOOR FOR A VENDING MACHINE

(71) Applicant: AUTOMATED RETAIL TECHNOLOGIES, LLC, Sarasota, FL (US)

(72) Inventors: James Edward Deaton, Georgetown, TX (US); Linda H. Wu, Newberg, OR (US); John C. Serieka, Chicago, IL (US); Lynn Warren Hamrick, Leander, TX (US); Sean Raymond Lucas, Leander, TX (US); William Warrenburg, Austin, TX (US); Brent Joseph Clafferty, Round Rock, TX (US)

(73) Assignee: AUTOMATED RETAIL TECHNOLOGIES, LLC, Sarasota, FL (US)

( * ) Notice: Subject to any disclaimer, the term of this patent is extended or adjusted under 35 U.S.C. 154(b) by 1151 days.

(21) Appl. No.: 16/964,289

(22) PCT Filed: Jan. 31, 2019

(86) PCT No.: PCT/US2019/015983

§ 371 (c)(1),
(2) Date: Jul. 23, 2020

(87) PCT Pub. No.: WO2019/152606

PCT Pub. Date: Aug. 8, 2019

(65) Prior Publication Data

US 2020/0357219 A1 Nov. 12, 2020

Related U.S. Application Data

(60) Provisional application No. 62/625,552, filed on Feb. 2, 2018.

(51) Int. Cl.
*G07F 9/10* (2006.01)
*G07F 17/00* (2006.01)

(52) U.S. Cl.
CPC ................ *G07F 9/10* (2013.01); *G07F 9/105* (2013.01); *G07F 17/0078* (2013.01)

(58) Field of Classification Search
CPC ......... G07F 9/10; G07F 9/105; G07F 17/0078
(Continued)

(56) References Cited

U.S. PATENT DOCUMENTS 3,246,938 A * 4/1966 Noren ................ A47L 15/0081 134/58 D
3,724,526 A * 4/1973 Huprich .................. E06B 9/115 160/368.1

(Continued)

FOREIGN PATENT DOCUMENTS

EP 1120756 A1 * 8/2001 .............. G07F 11/10
EP 1222893 A2 * 7/2002 ......... A47L 15/0081

(Continued)

OTHER PUBLICATIONS

International Search Report filed in PCT/US2019/015983 mailed Apr. 8, 2019.

*Primary Examiner* — Rakesh Kumar
(74) *Attorney, Agent, or Firm* — Shumaker, Loop & Kendrick, LLP

(57) ABSTRACT

A vending machine is adapted for dispensing a pre-packaged food product provided in a refrigerated enclosure housed in the vending machine. The vending machine includes an oven including a housing defining a cavity for receiving the pre-packaged food product. The housing has a sidewall with a sidewall opening providing access to the cavity. A side door is mounted to the sidewall for closing and opening the sidewall opening. A drive mechanism is connected to the side door and adapted to mechanically move the side door of
(Continued)

the oven between a closed position and an opened position. The drive mechanism includes a sensing device adapted to determine whether the side door is in one of the closed position and the opened position. A door frame is mounted to the sidewall and has a guide track. The side door is movably received in the guide track.

18 Claims, 7 Drawing Sheets

(58) Field of Classification Search
USPC ......... 221/150; 296/146.1, 155; 49/360, 169
See application file for complete search history.

(56) References Cited

U.S. PATENT DOCUMENTS 3,745,707 A * 7/1973 Herr .................... B61D 19/005 49/477.1
4,176,268 A 11/1979 Gerling
4,229,907 A * 10/1980 Hall ...................... E05F 15/652 49/362
4,592,485 A 6/1986 Anderson et al.
4,677,278 A 6/1987 Knoll
4,783,582 A * 11/1988 Wada ..................... H05B 6/808 219/679
4,800,946 A * 1/1989 Rosenoy ................... E06B 9/40 160/264
4,995,195 A * 2/1991 Olberding .................. B60J 5/00 49/362
5,147,994 A * 9/1992 Smith ................ B65D 81/3453 219/679
5,564,594 A 10/1996 Monfredo
5,799,822 A * 9/1998 Rudewicz .............. H05B 6/808 219/678
5,818,014 A * 10/1998 Smith .................. H05B 6/6408 219/679
5,958,278 A 9/1999 Engebritson et al.
6,498,329 B1 12/2002 Gibernau
6,518,553 B1 * 2/2003 Leykin ................. H05B 6/6411 219/679
6,713,741 B2 * 3/2004 Miller ...................... A21B 1/48 219/699
6,717,120 B2 4/2004 Fritts et al.
6,808,083 B2 * 10/2004 Roekens ............. G07F 17/0078 221/150 HC
7,040,056 B2 * 5/2006 DuBose ................ E05F 15/652 49/362
8,763,323 B1 * 7/2014 Even ......................... E04H 7/22 52/192
10,024,548 B2 * 7/2018 Wiker ..................... F24C 3/122
2001/0045430 A1 11/2001 Mawoud
2002/0088800 A1 * 7/2002 Miller ...................... A21B 3/02 219/700
2015/0014305 A1 1/2015 Monahan et al.
2020/0357219 A1 * 11/2020 Deaton ................... G07F 11/16

FOREIGN PATENT DOCUMENTS

WO WO-9428700 A2 * 12/1994 .............. G07F 11/04
WO WO-2021154580 A1 * 8/2021 ............... A21B 1/44

* cited by examiner

AUTOMATED SIDE OPENING OVEN DOOR FOR A VENDING MACHINE

BACKGROUND

Automatic food dispensers or vending machines for dispensing pre-packaged food products are well known. Typically, the vending machine includes a cabinet or housing having mounted therein a refrigerated enclosure that includes refrigerated passages or compartments for storing pre-packaged food products to be dispensed. The vending machine can further be provided with an oven and a conveying system operable to remove one of the food products from the refrigerated enclosure and position the food product within the oven for cooking. The present disclosure relates to an automated side opening door for the oven.

SUMMARY

According to one aspect, a vending machine is adapted for dispensing an associated pre-packaged food product provided in a refrigerated enclosure housed in the vending machine. The vending machine comprises an oven including a housing defining a cavity for receiving the associated pre-packaged food product. The housing has a sidewall with a sidewall opening providing access to the cavity. A side door is mounted to the sidewall for closing and opening the sidewall opening. A drive mechanism is operably connected to the side door and adapted to mechanically move the side door between a closed position and an opened position. The drive mechanism includes at least one sensing device adapted to determine whether the side door is in one of the closed position and the opened position. A door frame is mounted to the sidewall and has a guide track. The side door is movably received in the guide track.

According to another aspect, a drive mechanism for automatically moving a side door provided on a sidewall of an oven between a closed position and an opened position is provided. The drive mechanism comprises a carriage adapted to be mounted to the side door. An actuator is coupled to the carriage and operably to move the carriage. The actuator includes a threaded rod threadingly coupled to the carriage. A first sensing device is operably connected to the actuator and adapted to detect the side door in the opened position and deactivate the actuator in the opened position of the side door. A second sensing device is operably connected to the actuator and adapted to detect the side door in the closed position and deactivate the actuator in the closed position of the side door.

BRIEF DESCRIPTION OF THE DRAWINGS

FIG. 3 depicts a side door and a drive mechanism operably connected to the side door, the side door in a closed position.

DETAILED DESCRIPTION

Figure 1:
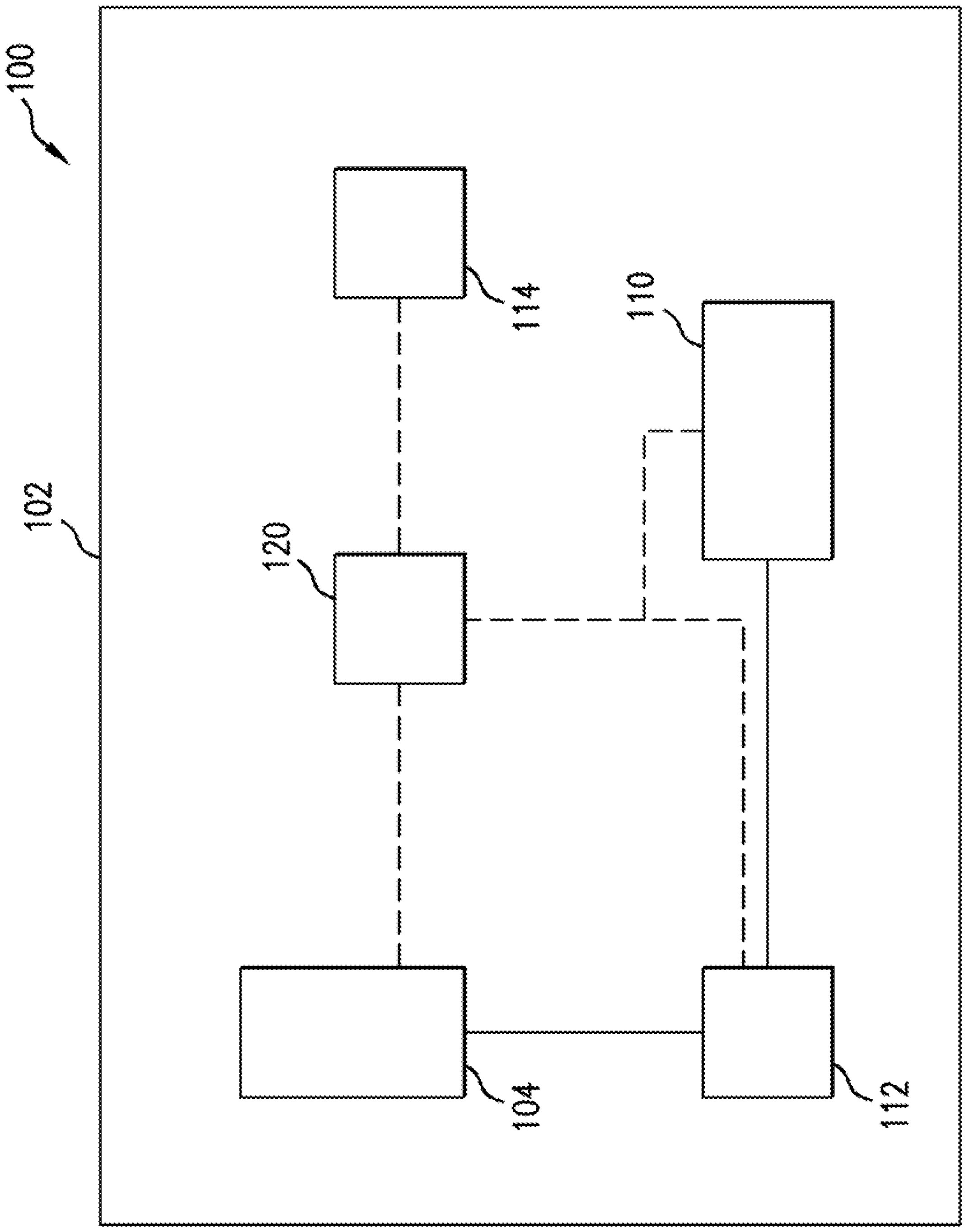
FIG. 1 is a schematic view of a vending machine according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically depicts a vending machine 100 according to the present disclosure. The term "vending machine" is used to denote any type of machine that stores products for remote distribution or sale to consumers wherein the consumer transacts business with the vending machine. The vending machine 100 generally includes a cabinet or housing 102 for housing various operational components of the vending machine. The operational components can comprise at least one refrigerated enclosure 104 that includes refrigerated passages or compartments for storing pre-packaged food products to be dispensed, an oven 110 for heating/cooking the food product, and a conveying system 112 (e.g., a conveyor, a robotic arm, and the like) operable to remove one of the food products from the refrigerated enclosure 104 and position the food product within a cavity of the oven 110 for cooking. It should be appreciated that the oven 110 can be a number of different types of ovens, including microwave, radio frequency, infrared, convection, resistive element and combinations of these types. In the depicted aspect, the oven 110 is a microwave oven.

As is well known, the vending machine 100 includes a front operational panel 114, which can include a display screen, a keypad, a credit/debit card reader, a cash acceptor opening, a change return, and a receipt printer. All of these features are electronically coupled with a central processing unit (CPU) 120 for automated operation of the vending machine 100. The food products available for selection from the vending machine 100 optionally are viewable through a window on the housing 102 or visualized via a graphical user interface and can be selected, for example, by entering a code using the keypad or touchscreen. The CPU 120 can include a transaction processing module configured to verify receipt of payment for the selected food product, generate a change return signal that causes any remaining money credit to be returned through the change return, generate a dispensing signal for the conveying system to permit the selected food product to be retrieved from the refrigerated enclosure 104 and delivered to the oven 110, and generate a cooking signal that selectively operates the oven 110 based on the selected food product. The basic operation of the vending machine 100 is well understood, and a detailed explanation thereof is not necessary for an understanding of the present invention.

Figure 2:
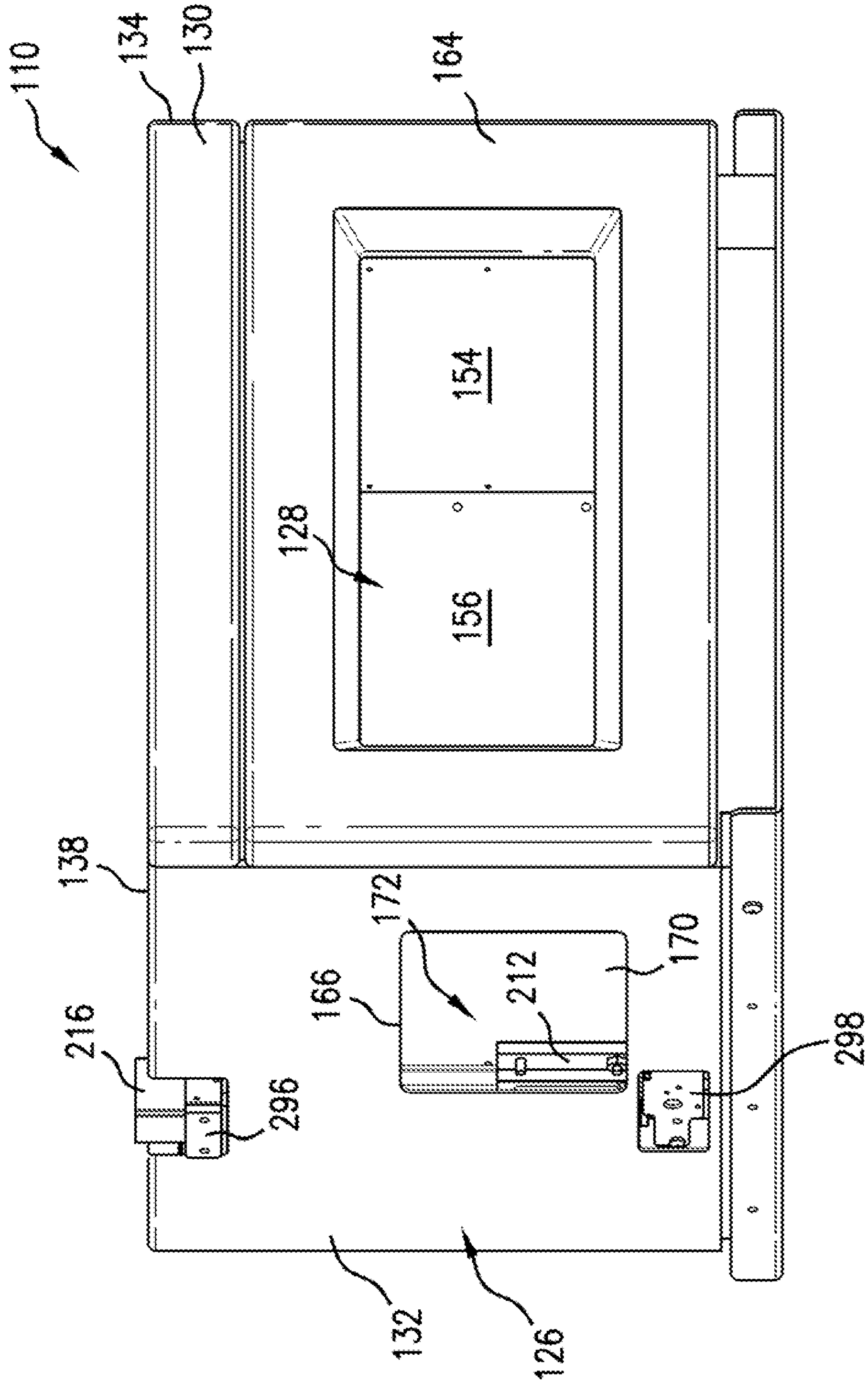
FIG. 2 is a perspective view of an exemplary oven of the vending machine.
Figure 3:
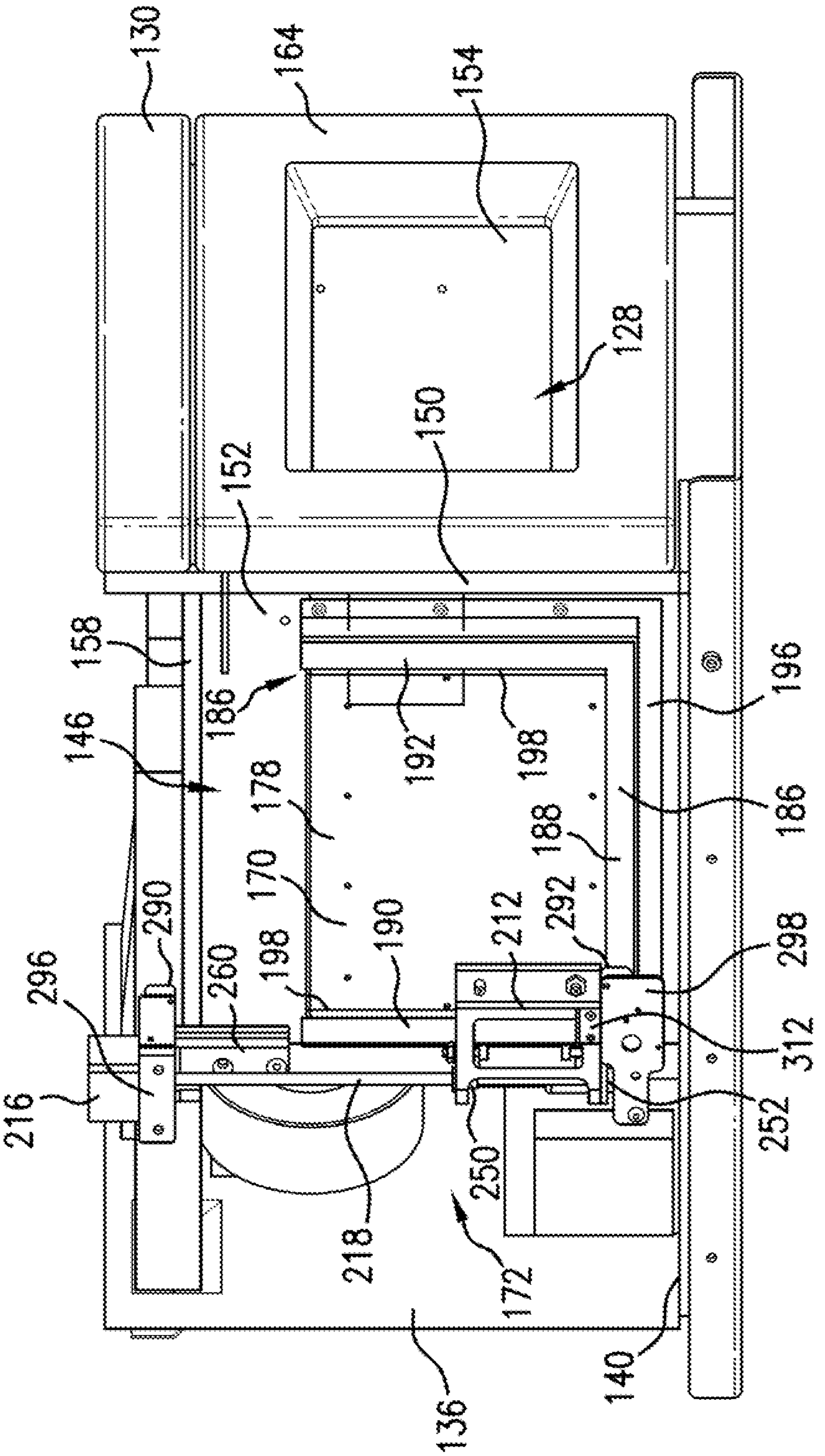
FIG. 3 is a perspective view of the oven of FIG. 2 with a part of its housing removed.
Figure 4:
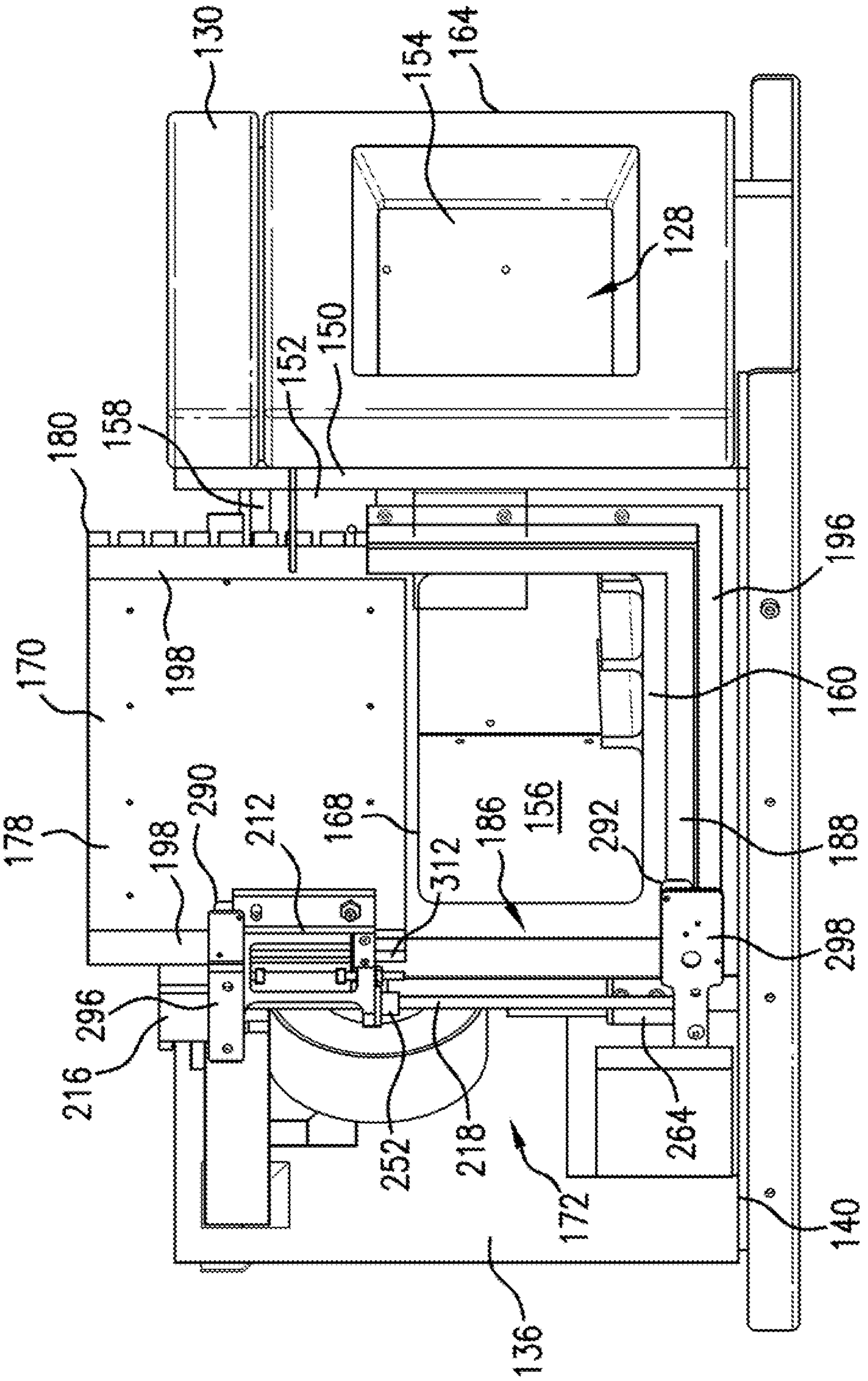
FIG. 4 is a perspective view of the oven of FIG. 3 with the side door in an opened position.

As shown in FIGS. 2-4, the oven 110 includes an exterior housing or frame 126 generally defining a cavity 128 for receiving the food product. The housing 126 includes a front wall 130, a pair of sidewalls 132, 134, a back wall 136, a top wall 138 and a bottom wall 140. According to one aspect, the cavity 128 of the oven 110 is further defined by an interior housing 146 located within the frame 126 and including an interior front wall 150, a pair of interior sidewalls 152, 154, an interior back wall 156, a top wall or splatter shield 158, and an interior bottom wall 160. As is well known, a front door 164 is pivotally mounted to one of the front wall 130 and interior front wall 150 for closing and opening a front access opening to the cavity 128; however, because the oven 110 is configured for use in the vending machine 100 the front door 164 is not accessible to the user. Further, the sidewall 132 includes a side opening 166 and the interior sidewall 152 includes a corresponding side opening 168. The side openings 166, 168 provide a secondary access to the cavity 128 through which a selected food product can be delivered from the refrigerated enclosure 104 into the cavity 128 by the conveying system 112 for heating/cooking. According to the present disclosure, a side door 170 is mounted to the interior sidewall 152 for closing and opening the side openings 166, 168, and a drive mechanism 172 is operably connected to the side door 170 and adapted to mechanically move the side door 170 of the oven 110 between a closed position (FIG. 3) and an opened position (FIG. 4).

The side door 170, which can be rectangular shaped, includes an outer surface 178 and an inner surface 180, which in the closed position of the side door 170 further defines the cavity 128. According to the aspect where the oven 110 is a microwave oven, the side door 170 is configured as a radiation choke to prevent microwaves from escaping from the cavity 128. The side door 170 is movably received in a guide track 184 of a door frame 186 mounted to the interior sidewall 152. As depicted, the door frame 186 can be generally U-shaped and includes a bottom part 188 and side parts 190, 192, each of the parts being spaced from the interior sidewall 152 to define the guide track 184. A mounting flange 196 extends outwardly from the door frame 186 for connection to the interior sidewall 152. The side door 170 when properly received in the guide track 184 is movably held between the interior sidewall 152 and the door frame 186. According to one aspect, anti-friction material 198 can be applied to selected areas of the outer and inner surfaces 178, 180 of the side door 170 to allow the side door 170 to easily move between the closed and opened positions. By way of example, Teflon® tape can be adhered to the side door 170 such that the tape is interposed between the side door 170 and door frame 186 and the side door 170 and interior sidewall 152.

Figure 5:
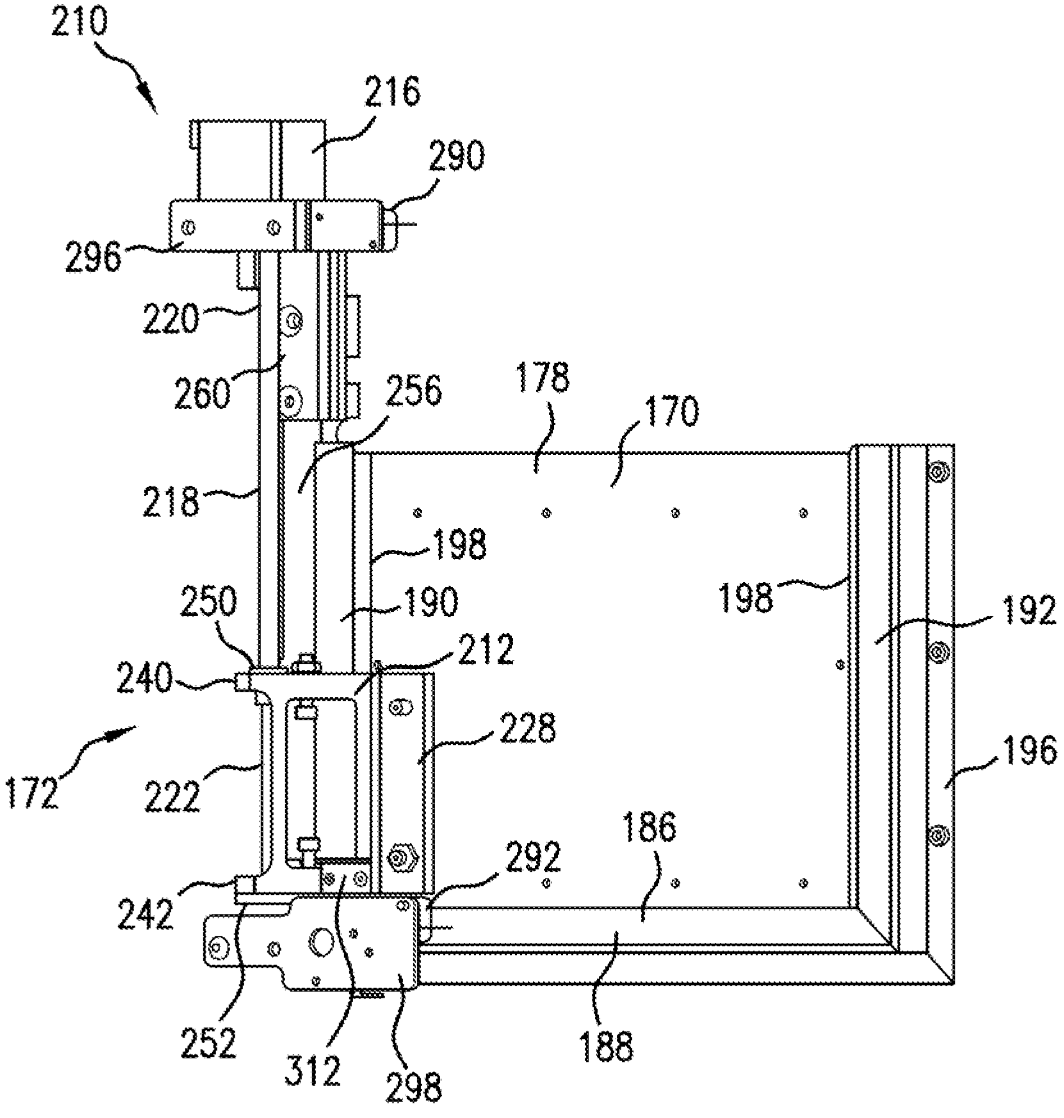
FIG. 5 is a perspective view of the drive mechanism.
Figure 6:
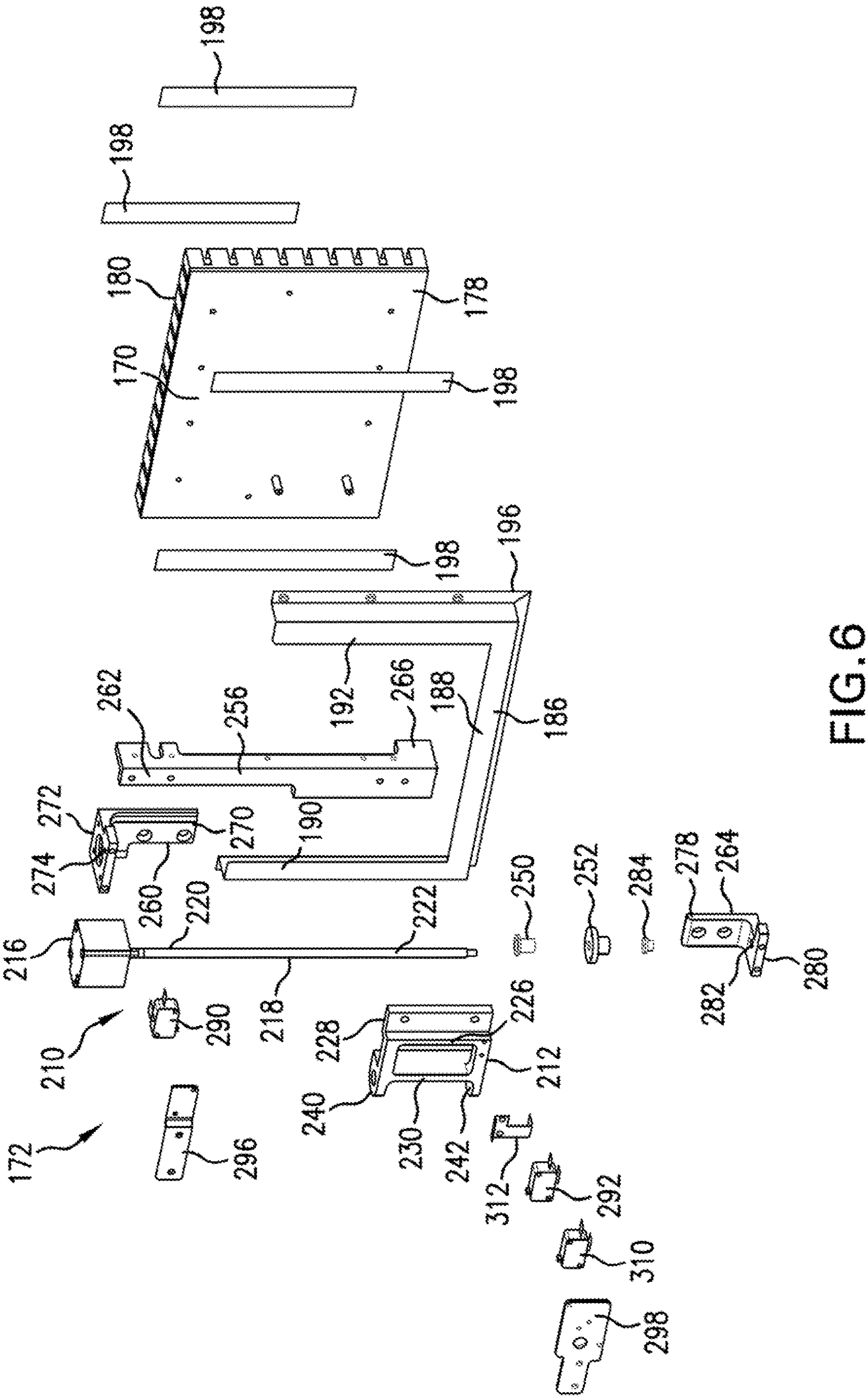
FIGS. 6 and 7 are exploded perspective views of the drive mechanism.
Figure 7:
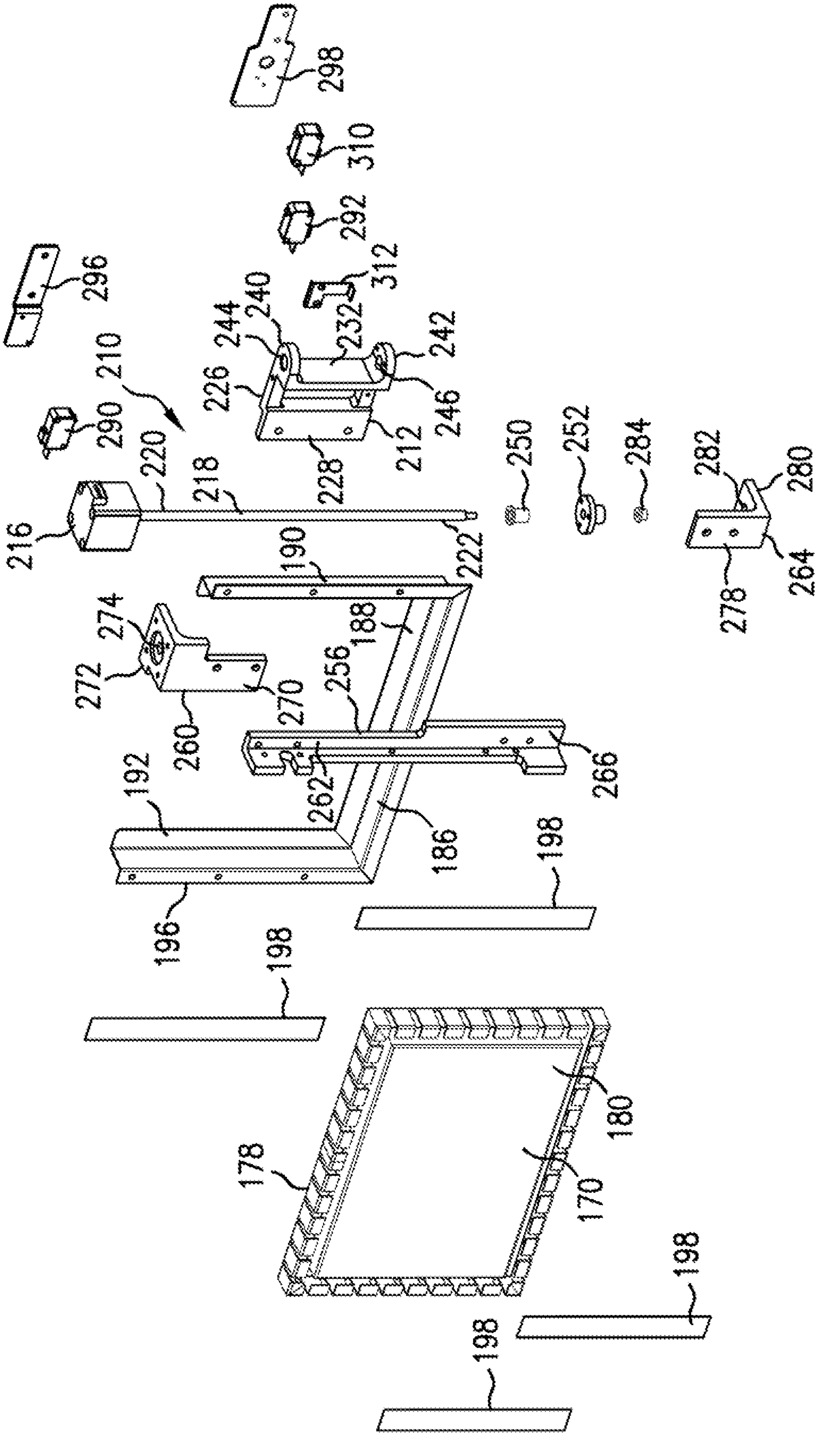

With particular reference to FIGS. 5-7, the exemplary drive mechanism 172 includes an actuator 210 operably connected to the side door 170. In the illustrated embodiment, the actuator 210 is coupled to a carriage 212 mounted to the side door 170, and the actuator 210 is operable to move the carriage 212 (and, in turn, the side door 170) in the height direction of the oven 110. Although, it should be appreciated that the drive mechanism 172 can be arranged so that the side door 170 is movable in a width direction of the oven 110. In the depicted aspect, the actuator 210 includes a motor 216 and a threaded rod 218 having a first end portion 220 coupled to the motor 216 and a second end portion 222. As shown, the threaded rod 218 is threadingly coupled to the carriage 212 whereby rotation of the threaded rod causes corresponding vertical movement of the carriage 212. By way of example, provided at a first side 226 of the carriage 212 is a first mounting flange 228 and provided at a second side 230 of the carriage 212 is a second mounting flange 232. The first mounting flange 228 is offset from an outer surface 234 of the carriage 212 and is secured to the outer surface 178 of the side door 170. The second mounting flange 232 is oriented perpendicular to the outer surface 234 of the carriage 212 and has upper and lower mounting tabs 240, 242 projecting therefrom. Each of the mounting tabs 240, 242 includes apertures 244, 246 for the threaded rod 218. As indicated above, the threaded rod 218 is threadingly coupled to the carriage 212 so that rotation of the threaded rod 218 vertically moves the carriage 212, and, in turn, the side door 170 between the closed and opened positions. To this end, according to one aspect, a carriage bearing 250 for the threaded rod 218 is fitted in the aperture 244 of the upper mounting tab 240, and an actuator nut 252 is positioned beneath and fastened to the lower mounting tab 242. The threaded rod 218 is threaded onto the actuator nut 252.

Further, the actuator 210 can be secured to a mounting rail 256 mounted to both the interior back wall 156 and the door frame 186 and extended parallel to that portion of the guide track 184 defined by the side parts 190, 192 of the door frame 186. An actuator mount 260 is secured to a first end portion 262 of the mounting rail 256 and a threaded rod mount 264 is secured to a second end portion 266 of the mounting rail 256. The actuator mount 260 includes a first part 270 to be fastened to the first end portion 262 and a second part 272. The second part 272 can be fastened to the motor 216 and includes an opening 274 for the threaded rod 218. The threaded rod mount 264 includes a first part 278 to be fastened to the second end portion 266 and a second part 280. The second part 280 includes an opening 282 for a threaded rod bearing 284 sized to receive the second end portion 222 of the threaded rod 218.

According to the present disclosure, the exemplary drive mechanism 172 includes at least one sensing device adapted to determine whether the side door 170 is in one of the closed position and the opened position. The at least one sensing device can be in communication with the CPU 120, which, in turn, allows for operation of the oven 110 when the side door 170 is in the closed position. In the depicted embodiment, the at least one sensing device is a first sensing device 290 operably connected to the actuator 210 and adapted to detect the side door 170 in the opened position, and the drive mechanism 172 further includes a second sensing device 292 operably connected to the actuator 210 and adapted to detect the side door 170 in the closed position. According to the present embodiment, the first sensing device 290, which can be a first micro-switch, is mounted to the actuator mount 260, particularly the second part 272 of the actuator mount 260, by an upper switch mount 296. The second sensing device 292, which can be a second micro-switch, is mounted to the threaded rod mount 264, particularly the second part 280 of the threaded rod mount 264, by a lower switch mount 298. The first and second sensing devices 290, 292 are positioned such that the first sensing device 290 is actuated by the carriage 212 in the opened position of the side door 170 and the second sensing device 292 is actuated by the carriage 212 in the closed position of the side door 170. It should be appreciated that actuation of either of the first and second sensing devices 290, 292 deactivates the actuator 210. It should also be appreciated that the first and second sensing devices 290, 292 can be in communication with the CPU 120 allowing for proper timing of the conveying system 112 and operation of the oven 110. The exemplary drive mechanism 172 can further include a third sensing device 310, which can be a third micro-switch, operably connected to a power component of the oven 110 (e.g., a magnetron for a microwave oven). The third sensing device can be mounted to the lower switch mount 298 below the second sensing device 292. A plunger 312 can be mounted to the carriage 212 so that in the closed position of the side door 170 the plunger 312 actuates the third sensing device 310. With this arrangement, in the closed position of the side door 170 the third sensing device 310 is actuated allowing for operation of the power component, and in the opened position of the side door 170 the third sensing device 310 is deactivated preventing operation of the power component. The third sensing device 310 can also be in communication with the CPU 120 which can further control the operation of the oven 110.

It will be appreciated that the above-disclosed and other features and functions, or alternatives or varieties thereof, may be desirably combined into many other different systems or applications. By way of example, the oven 110 can be configured to include side doors 170 on opposing side-walls which would allow for the food products to be transferred through the oven 110 (i.e., inserted though one sidewall and delivered though the other sidewall). The oven 110 can also be configured to include the side door 170 on at least one of the top wall and bottom wall of the oven. Also that various presently unforeseen or unanticipated alternatives, modifications, variations or improvements therein may be subsequently made by those skilled in the art which are also intended to be encompassed by the following claims.

The invention claimed is:

1. A vending machine adapted for dispensing associated pre-packaged food products provided in a refrigerated enclosure housed in the vending machine, the vending machine comprising:

an oven including:

a housing defining a cavity for receiving the associated pre-packaged food products, the housing having a sidewall with a sidewall opening providing access to the cavity;

a side door mounted to the sidewall for closing and opening the sidewall opening, the side door comprising an outer surface and an inner surface opposite the outer surface, wherein selected areas of the outer surface and the inner surface include anti-friction material adhered thereto, the anti-friction material facilitating movement of the side door;

a drive mechanism operably connected to the side door and adapted to mechanically move the side door of the oven between a closed position and an opened position, the drive mechanism including at least one sensing device adapted to determine whether the side door is in one of the closed position and the opened position; and a door frame mounted to the sidewall and having a guide track, the side door movably received in the guide track, wherein the drive mechanism includes an actuator coupled to a carriage, the carriage comprising:

a first side comprising a first mounting flange offset from an outer surface of the carriage and mounted to the outer surface of the side door; and a second side comprising a second mounting flange perpendicularly oriented to the outer surface of the carriage and including mounting projecting therefrom that comprise respective apertures;

wherein the actuator is operable to move the carriage, which thereby moves the side door, and wherein the actuator includes a motor and a threaded rod having a first end portion coupled to the motor and a second end portion, wherein the threaded rod is threadingly coupled to the respective apertures of the second mounting flange of the second side of the carriage such that rotation of the threaded rod causes corresponding movement of the carriage, the mounting tabs including:

an upper mounting tab, which includes a respective aperture through which a carriage bearing is inserted, and a lower mounting tab against which an actuator nut threadingly coupled to the threaded rod is fastened.

2. The vending machine of claim 1, wherein the anti-friction material comprises Teflon tape.

3. The vending machine of claim 1, further including a conveying system operable to remove the associated pre-packaged food product from the refrigerated enclosure and position the associated pre-packaged food product through the sidewall opening and within the cavity.

4. The vending machine of claim 1, wherein the actuator is secured to a mounting rail mounted to the door frame and extended parallel to the guide track.

5. The vending machine of claim 4, wherein an actuator mount is secured to a first end portion of the mounting rail and a threaded rod mount is secured to a second end portion of the mounting rail, the second end portion of the threaded rod secured to the threaded rod mount.

6. The vending machine of claim 2, wherein the at least one sensing device is a first sensing device operatively connected to the actuator and adapted to detect the side door in the opened position, and further including a second sensing device operably connected to the actuator and adapted to detect the side door in the closed position, and wherein the first and second sensing devices are mounted to respective upper and lower switch mounts, the carriage actuates the first sensing device in the opened position of the side door, and the carriage actuates the second sensing device in the closed position of the side door.

7. The vending machine of claim 6, including a third sensing device operably connected to a power component of the oven, wherein in the closed position of the side door the third sensing device is actuated allowing for operation of the power component, and in the opened position of the side door the third sensing device is deactivated preventing operation of the power component.

8. The vending machine of claim 7, including a plunger mounted to the carriage, the plunger adapted to actuate the third sensing device.

9. The vending machine of claim 1, further including an anti-friction material interposed between the side door and the door frame.

10. A drive mechanism system, comprising:

a side door is provided on a sidewall of an oven and is configured to be moved between a closed position and an opened position, wherein the side door comprises:

an outer surface; and an inner surface opposite the outer surface;

wherein selected areas of the outer surface and the inner surface include anti-friction material adhered thereto, the anti-friction material facilitating movement of the side door between the closed position and the opened position;

a drive mechanism for automatically moving the side door, the drive mechanism comprising:

a carriage including a first side and a second side, the first side of the carriage adapted to be mounted to an outer surface of the side door;

an actuator coupled to the carriage and operable to move the carriage, the actuator including a threaded rod threadingly coupled to the second side of the carriage;

a first sensing device operatively connected to the actuator and adapted to detect the side door in the opened position and deactivate the actuator in the opened position of the side door; and a second sensing device operatively connected to the actuator and adapted to detect the side door in the closed position and deactivate the actuator in the closed position of the side door, wherein the drive mechanism includes an actuator coupled to the carriage, in which the first side of the carriage comprises a first mounting flange offset from an outer surface of the carriage and mounted to the outer surface of the side door; and the second side of the carriage comprises a second mounting flange perpendicularly oriented to the outer surface of the carriage and including mounting tabs projecting therefrom that comprise respective apertures;

wherein the actuator is operable to move the carriage, which thereby moves the side door, and wherein the actuator includes a motor and a threaded rod having a first end portion coupled to the motor and a second end portion, wherein the threaded rod is threadingly coupled to the respective apertures of the second mounting flange of the second side of the carriage such that rotation of the threaded rod causes corresponding movement of the carriage, the mounting tabs including:

an upper mounting tab, which includes a respective aperture through which a carriage bearing is inserted; and a lower mounting tab against which an actuator nut threadingly coupled to the threaded rod is fastened.

11. The drive mechanism system of claim 10, wherein the anti-friction material comprises Teflon tape.

12. The drive mechanism system of claim 10, wherein the first and second sensing devices are mounted to respective upper and lower switch mounts, the carriage actuates the first sensing device in the opened position of the side door, and the carriage actuates the second sensing device in the closed position of the side door.

13. The drive mechanism system of claim 12 in combination with the oven, the oven including:

a housing defining a cavity, the housing having a sidewall with a sidewall opening providing access to the cavity;

the side door mounted to the sidewall for selectively closing and opening the sidewall opening; and a door frame mounted to the sidewall and having a guide track, the side door slidingly received in the guide track.

14. The combination of claim 13, wherein the actuator is secured to a mounting rail secured to the door frame and extended parallel to the guide track.

15. The combination of claim 13, including a third sensing device operably connected to a power component of the oven, wherein the closed position of the side door the third sensing device is actuated allowing for operation of the power component, and in the opened position of the side door the third sensing device is deactivated preventing operation of the power component.

16. The combination of claim 15, including a plunger mounted to the carriage, the plunger actuating the third sensing device.

17. The drive mechanism system of claim 10 in combination with a vending machine, the vending machine housing a refrigerated enclosure for storing an associated pre-packaged food product and an oven for cooking the associated pre-packaged food product, the oven including a housing defining a cavity for receiving the associated pre-packaged food product from the refrigerated enclosure, the housing having a sidewall with a sidewall opening providing access to the cavity, the side door mounted to the sidewall for selectively closing and opening the sidewall opening.

18. The combination of claim 17, wherein the vending machine further includes a conveying system operable to remove the associated pre-packaged food product from the refrigerated enclosure and position the associated pre-packaged food product through the sidewall opening and within the cavity.

* * * * *